May 5, 1931. A. W. SIZER 1,804,283
MOLDING MACHINE
Filed Sept. 29, 1930 2 Sheets-Sheet 2

Inventor
Albert W. Sizer,

Patented May 5, 1931

1,804,283

UNITED STATES PATENT OFFICE

ALBERT WILLIAM SIZER, OF HESSLE, ENGLAND

MOLDING MACHINE

Application filed September 29, 1930. Serial No. 485,237.

The present invention relates to an improved molding machine, more particularly suitable for dealing with materials having a high moisture content.

The invention is particularly applicable to the manufacture of cattle cake having a high molasses content, and is for instance, suitable for making cattle cake with up to 50% molasses.

The machine of this invention comprises a ring having a plurality of radial ports or passages extending from its inner periphery to its outer periphery and a toothed wheel, the teeth of which are equal in pitch to the pitch of the passages and mesh with the openings thereof at one end.

The invention is more particularly described with reference to the accompanying drawings in which:—

Figure 1:
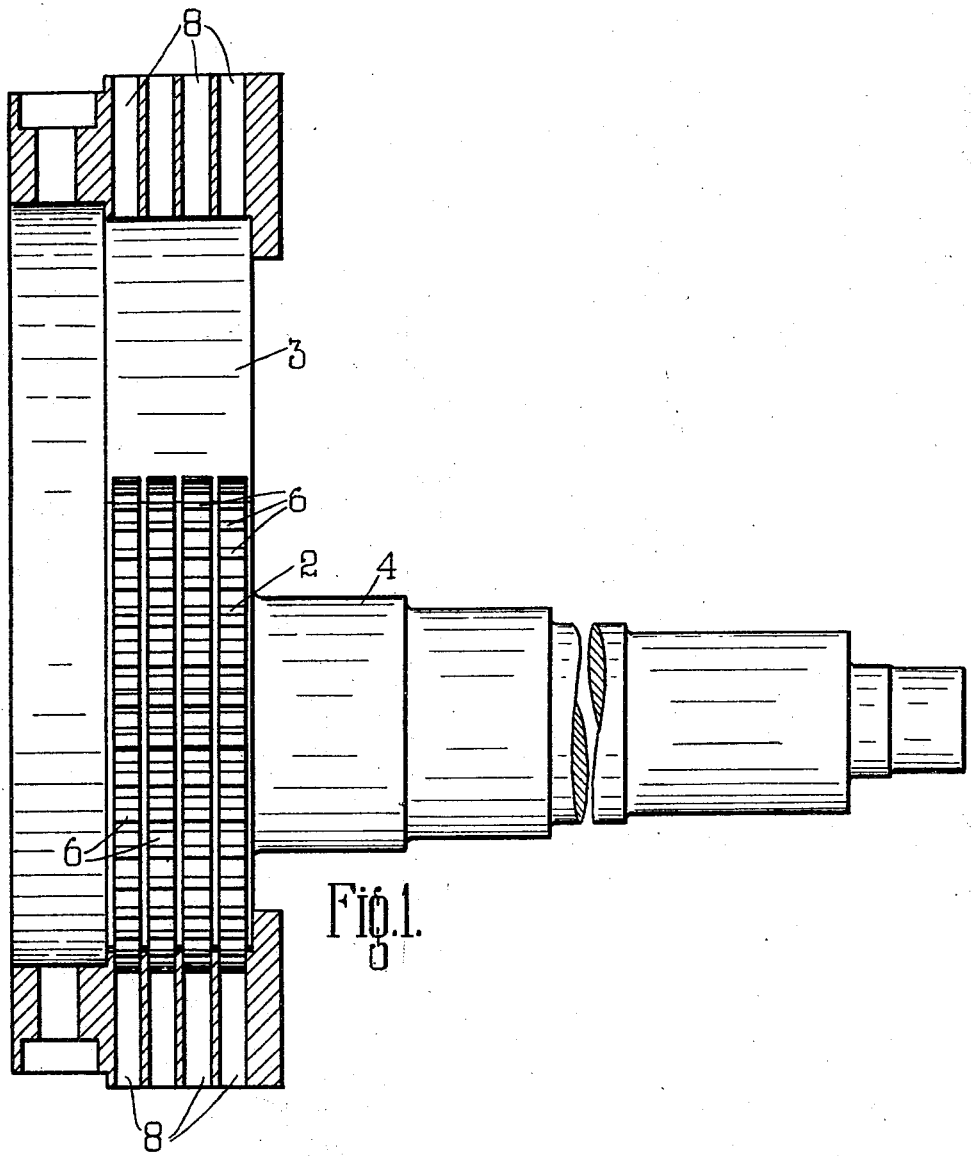
Figure 1 is a side view of the machine.
Figure 2:
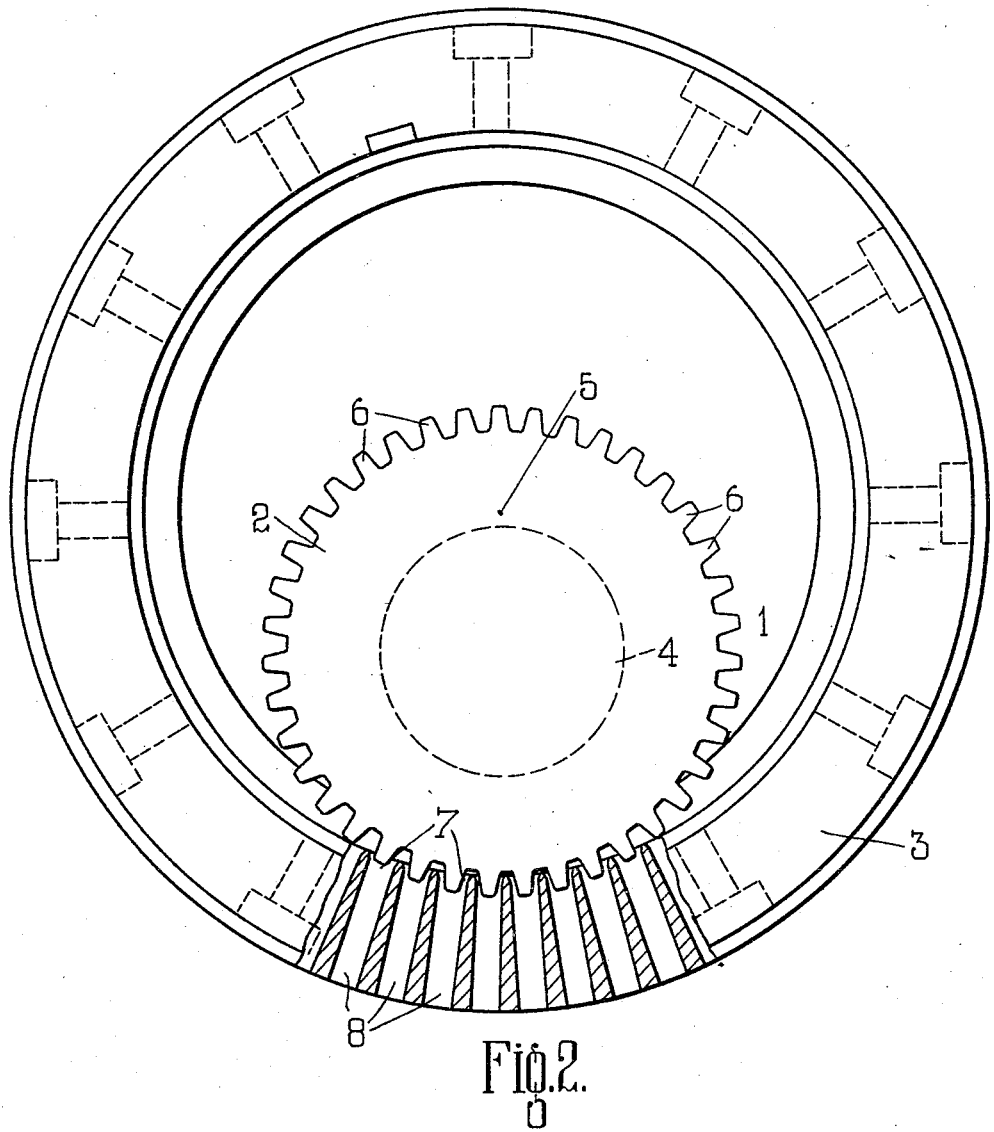
Figure 2 is a corresponding end view.

Material, such as a 50% molasses mixture is fed into a space 1 between a roller 2 and an annular ring 3, the roller 2 rotating about an axis 4, whilst the annular ring 3 rotates about an axis 5. It will be noticed that the teeth 6 of the roller 2 are similar with, and mesh within, the openings 7 of radial ports 8 cut in the ring. A doctor or stripping blade is provided on the outside of the ring 3 to strip the cakes extruded therefrom. The ring 3 and roller 2 may be detachable units from the machine, so that they may be interchanged where cakes of differing size or shape are to be manufactured.

I declare that what I claim is:—

1. A machine for molding plastic substances comprising in combination an annular ring having spaced radial passages therein, a solid toothed molding wheel having teeth of equal pitch to the pitch of said passages and engaging with said passages on the inner periphery of said ring.

2. A machine for molding plastic substances comprising in combination an annular ring having spaced radial passages therein, a solid toothed molding wheel having teeth of equal pitch to the pitch of said passages and engaging with said passages on the inner periphery of said ring, said molding wheel being provided with a number of peripheral grooves, and a number of peripheral upstanding flanges on the interior of said ring adapted to engage within the grooves of the molding wheel.

In witness whereof, I have hereunto signed my name this 12th day of September, 1930.

ALBERT WILLIAM SIZER.